United States Patent [19]

Basila et al.

[11] 4,040,982
[45] Aug. 9, 1977

[54] OZONIZATION CATALYST

[75] Inventors: Michael R. Basila, Munster, Ind.; Frank R. Broersma, Fullerton, Calif.

[73] Assignee: Nalco Chemical Company, Oak Brook, Ill.

[21] Appl. No.: 648,133

[22] Filed: Jan. 12, 1976

[51] Int. Cl.² .................... B01J 21/04; B01J 23/74
[52] U.S. Cl. ............................ 252/466 J; 210/63 Z
[58] Field of Search ............. 252/466 J; 210/63 R, 210/63 Z

[56] References Cited

U.S. PATENT DOCUMENTS

| 3,799,887 | 3/1974 | Brennan | 252/466 J |
| 3,804,756 | 4/1974 | Callahan et al. | 210/63 R |

FOREIGN PATENT DOCUMENTS

| 56,775 | 5/1969 | Poland | 252/472 |

*Primary Examiner*—W. J. Shine
*Attorney, Agent, or Firm*—Richard L. Johnston

[57] ABSTRACT

Contaminants are removed from contaminated waste water by passing such waste water intimately mixed with ozone into contact with an ozone catalyst comprising ferric oxide supported on catalytically active alumina.

2 Claims, No Drawings

OZONIZATION CATALYST

BACKGROUND

It has been known for some time that waste waters containing contaminants such as impurities discharged from gas works, coke ovens, generator stations, oil refineries and certain areas of the chemical industry, particulary where such waste waters include phenols and other organic contaminants, can be treated with ozone in order to decompose and eliminate such contaminants. Thus, as reported in Polish Pat. No. 56,775 of May 15, 1969, ozone has been used to purify water from coke ovens containing one to two grams of phenols per liter employing 1.6 to 2 grams of ozone per each gram of oxidized phenol in a continuous oxidation process. In a process involving the ozonization of ammonia water containing 150 to 270 mg/l of phenols, 1.2 to 1.5 g of ozone per g of oxidized phenol were consumed.

As reported in said Polish patent the cost of purifying one cubic meter of phenolic effluent by the continuous method using ozone has proved too expensive and uneconomical for industrial use. The Polish patent, therefore, suggests a continuous process in which waste waters are treated with ozone in a froth phase. This process involves the use of a scrubber packed with Rashig rings, slag and/or oxides of silver, copper, aluminum, zinc, magnesium, tin, lead, iron, or manganese as catalysts. The air or oxygen containing 1 to 2% ozone is blown countercurrent to the waste water. The flow rate of the waste water and air is adjusted in such a way that a froth phase exists in the middle of the scrubber, the liquid being in the lower level and the gas phase in the upper level. Due to the large surface interface, the ozone initiates the oxidation process of the phenols which is finally performed by means of oxygen.

OBJECTS

One of the objects of the present invention is to provide a new and more efficient process for increasing the effectiveness of ozone in oxidizing contaminants in water.

Another object of the invention is to provide a new and improved ozonization catalyst for use in the aforesaid process.

Other objects will appear hereinafter.

BRIEF SUMMARY OF THE INVENTION

In accordance with the invention a new and improved ozonization catalyst is provided comprising 1% to 20% by weight of ferric oxide supported on catalytically active alumina, said catalyst being water insoluble and having a surface area of 150 to 450 square meters per gram and a pore volume of at least 0.3 cc per gram.

The invention also provides a new and improved process for removing contaminants from contaminated waste water particularly waste water which is contaminated with organic contaminants which comprises passing such waste water intimately mixed with ozone into contact with the aforesaid catalyst.

DETAILED DESCRIPTION OF THE INVENTION

The catalysts employed in accordance with the invention are prepared by impregnating gamma alumina or some other form of catalytic alumina such as, for example, eta alumina, amorphorous alumina or activated alumina with an aqueous solution of a soluble ferric salt such as, for example, ferric nitrate, oven drying the impregnated alumina at 220° F. to 350° F. and calcining the resultant product at 950° F. to 1050° F. The catalyst can be in the form of spheres or an extrudate. In general, the resultant catalyst has a surface area within the range of 150 to 450 square meters per gram, preferably about 370 square meters per gram and a pore volume of at least 0.3 cc per gram, preferably about 0.95 cc per gram.

The invention will be further illustrated but is not limited by the following examples in which the quantities are given by weight unless otherwise indicated.

EXAMPLE I

A catalyst was prepared by impregnating a gamma alumina which had a surface area of 370 square meters per gram and a pore volume of 0.95 cc per gram with a ferric nitrate solution. 450 grams of the gamma alumina were pore volume impregnated with 425 mls of ferric nitrate solution containing 255 grams of $Fe(NO_3)_3.9H_2O$. The impregnated catalyst was oven dried at 250° F. and calcined at 1000° F. to give a catalyst containing approximately 10% $Fe_2O_3$ on alumina.

EXAMPLE II

The catalyst prepared as described in Example I was placed in a tubular reaction vessel surrounded by a cooling jacket which was cooled with water to a predetermined temperature. Waste water containing 100 mg/l of phenol was fed countercurrently into said tubular reaction vessel containing said catalyst to a stream of gas containing ozone. The liquid flow rate and the gas flow rates were varied. The total organic carbon (TOC) and the chemical oxygen demand (COD) were measured and the ratio of mg of ozone consumed to TOC removed and the ratio of ozone consumed to COD removed were determined with the results shown in Table I.

In carrying out these tests the liquid which was treated was at ambient temperature. Ambient temperatures are usually within the range of 15° C. to 25° C. Higher temperatures can be used but are not usually practical.

As shown by the results in the table, the ratio of grams of ozone used to grams of COD removed is 1.26 when the inlet ozone concentration is 1.7 mg/min and the $O_3$/COD is 1.77 when the initial ozone concentration is 6.0 mg/min. These values approach the theoretical $O_3$/COD value of one if all the atoms of oxygen in each ozone molecule are used to reduce COD. If only one atom per ozone molecule were used, the $O_3$/COD ratio would have approached three rather than one. Similarly, the ratio of grams of $O_3$ used per gram of TOC removed ($O_3$/TOC) is 4.39 for the lower ozone concentration and 5.77 for the higher. Again, if only one atom of oxygen per ozone molecule were used, the ratios would have approached 9.3 instead of the smaller value of 3.1 for the case in which all three atoms of oxygen are used.

The ozone used in these tests was produced in an ozone generator. It will be understood that the ozone can be mixed with oxygen or with air or possibly with other gases such as nitrogen.

The ozonization reaction is usually carried out at atmospheric pressures but subatmospheric or superatmospheric pressures can be employed.

The catalyst can also be used in cleaning up organic contaminants in gases or vapors.

TABLE I

| Phenol Feed Conc. (mg/l) | Liquid Flow Rate (ml/min) | Liquid Retention Time (Min) | | $O_3$ (0.1 l/min) | | | TOC | | | COD | | RATIO (mg/mg) | | |
|---|---|---|---|---|---|---|---|---|---|---|---|---|---|---|
| | | | | Conc. (mg/l) | Mass Flow Rate (mg/min) | | Conc. (mg/l) | Mass Rate (mg/min) | | Conc. (mg/l) | Mass Rate (mg/min) | $O_3$ Consumed / TOC Removed | $O_3$ Consumed / COD Removed | COD Removed / TOC Removed |
| 100 | 9.24 | 28 | in | 17.0 | 1.70 | in | 79 | 0.73 | in | 234 | 2.161 | 4.39 | 1.26 | 3.49 |
| | | | out | 3.61 | .361 | out | 46 | 0.425 | out | 119 | 1.100 | | | |
| | | | Consumed | — | 1.339 | Removed | — | 0.315 | Removed | — | 1.061 | | | |
| 100 | 9.75 | 28 | in | 61.3 | 6.13 | in | 79 | 0.772 | in | 234 | 2.287 | 5.77 | 1.77 | 3.27 |
| | | | out | 23.5 | 2.35 | out | 12 | 0.117 | out | 15 | 0.147 | | | |
| | | | Consumed | — | 3.78 | Removed | — | 0.655 | Removed | — | 2.140 | | | |
| 100 | 43.3 | 2 | in | 64.2 | 6.42 | in | 79 | 3.40 | in | 239 | 10.28 | 6.21 | 1.61 | 3.86 |
| | | | out | 27.8 | 2.78 | out | 65 | 2.80 | out | 185 | 7.96 | | | |
| | | | Consumed | — | 3.78 | Removed | — | 0.60 | Removed | — | 2.32 | | | |
| 500 | 43.0 | 2 | in | 65.8 | 6.58 | in | 396 | 17.03 | in | 1179 | 50.70 | 5.86 | 1.90 | 3.04 |
| | | | out | 7.8 | 0.78 | out | 373 | 16.04 | out | 1108 | 47.65 | | | |
| | | | Consumed | — | 5.8 | Removed | — | 0.99 | Removed | — | 3.05 | | | |

In general, the use of the aforementioned catalysts increases the number of oxygen atoms in ozone utilized for oxidation from 1 to 2, at least in the oxidation of phenol present in waste water. Further, it makes it possible to obtain lower levels of residual TOC than usual. For example, a TOC level of 80 ppm from phenol in the waste water was dropped to 5 ppm on 38 minutes retention in the catalyst zone. Residuals of this level are more difficult to obtain than just a high percentage of removal. The highest efficiencies, based on the number of atoms of oxygen used per mole of ozone consumed, are obtained in the range of 0.3% $O_3$ in the gas stream and at a retention time of 30–40 minutes.

Ozone without the catalyst or with an inert surface gives the expected result of one atom of active oxygen per mole of ozone consumed. Oxygen alone with the catalyst does not oxidize phenol.

The catalyst was reused over and over again and appeared to have outstanding activity.

While the invention has been illustrated with reference to the use of water containing phenol it will be understood that the ozonization catalyst and the process of using such catalyst with ozone is applicable to the oxidation and removal of other organic contaminants from waste water.

The catalytic process herein described has the potential of reducing the cost of ozone in an oxidation application by a factor of two which means about a 30% reduction in over-all costs.

It will be understood that other water soluble iron salts capable of being oxidized to ferric oxide can be used to impregnate the catalytic alumina in order to provide an ozonization catalyst containing 1% to 20% by weight of ferric oxide supported on catalytically active alumina having the other characteristics previously described.

The invention is hereby claimed as follows:

1. An ozonization catalyst consisting essentially of 1% to 20% by weight of ferric oxide supported on catalytically active alumina, said catalyst being water insoluble and having a surface area of 150–450 square meters per gram and a pore volume of at least 0.3 cc per gram.

2. A catalyst as claimed in claim 1 consisting essentially of approximately 10% by weight $Fe_2O_3$ intimately mixed with gamma alumina having a surface area of approximately 370 $m^2/g$ and a pore volume of approximately 0.95 cc/g, said catalyst being obtained by impregnating said gamma alumina with an aqueous solution of ferric nitrate, drying the impregnated alumina at 220°–350° F., and calcining the resultant product at 950°–1050° F.

* * * * *